Oct. 27, 1931.    T. J. McCORMICK    1,829,011
TIRE COVER
Filed Jan. 17, 1930
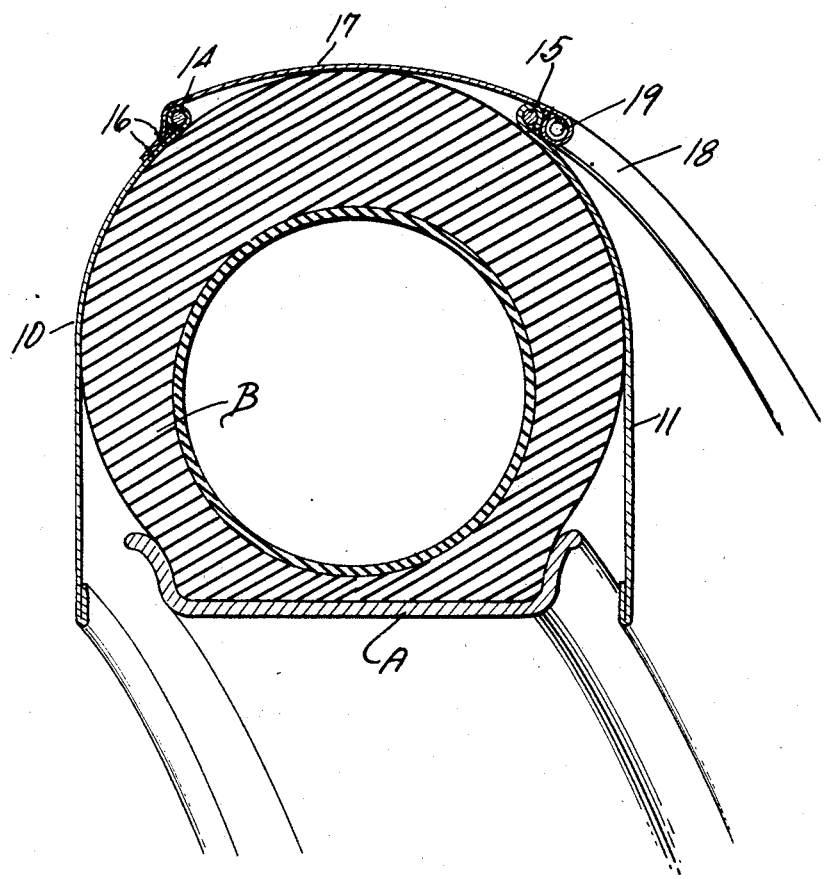
INVENTOR.
Thomas J. McCormick
BY
Francis O. Hardesty
ATTORNEY.

Patented Oct. 27, 1931

1,829,011

UNITED STATES PATENT OFFICE

THOMAS J. McCORMICK, OF DETROIT, MICHIGAN

TIRE COVER

Application filed January 17, 1930. Serial No. 421,345.

The present invention relates to tire covers and more especially to covers for tires normally disposed within wells on the running boards of automobiles.

A tire cover of this type must possess certain important characteristics. It must be free from loose or flapping parts and must be as neat in appearance as is possible, since being on the running board, it is exposed in such manner as to enhance or mar the beauty of the automobile upon which the tire is mounted.

Further, the tire cover must be readily detachable and releasable from the tire, so that delay in covering or uncovering the tire is eliminated.

Furthermore, a tire cover of this character must be inexpensive of manufacture.

The present invention, therefore, aims to provide tire covers having the qualities and characteristics above outlined.

In the drawing, the single figure shows, in cross section, a tire mounted on a rim and provided with a tire cover embodying the present invention.

Referring to the drawing, the rim A supports the tire B in the usual manner. The side walls of the tire cover comprise flat annular duplicate members 10 and 11 which engage the side walls of the tire and are of such dimensions as to completely enclose the side walls of the latter. The edges of the side members are provided with bead forming rings, as at 14 and 15, for reinforcing and rigidifying purposes. Securely attached to the beaded edge 14 of one of the side members, by stitching 16 or the like, is a cover portion or flap 17, comprising a cloth or leather cover member having a beaded edge 18 in which is enclosed an annular spring ring 19.

In use the tire cover is applied to the tire in the following manner. Side member 11 is disposed upon the side wall of the tire and the other part of the tire cover, namely, side member 10 having rigidly attached thereto the cover member 17 is placed upon the tire in such a position that the spring ring 19 may be snapped over and interlocked with the beaded edge 15 of the side member. The portions are then adjusted and smoothed down so as to completely and neatly enclose and protect the tire.

When it is desired to remove the cover from the tire, spring ring 19 may be distended in any suitable manner and snapped off the beaded edge 15 of the side member 10 whereupon the cover will readily release itself from the tire.

It is noted that the side members are wide enough to extend below the inner edge of the rim A, thereby thoroughly enclosing the latter and the tire. It is also obvious that side members 10 and 11 instead of being annular, may be disc like in shape, so that the tire is even more completely enclosed than as shown.

From the foregoing, it will be seen that the present invention provides a tire cover that is simple in its operation, economical of manufacture, and attractive in its appearance and which embodies the qualities desirable in tire covers.

Now having described the invention and the preferred forms of embodiment thereof, it is to be understood that the said invention is to be limited, not to the specific details herein set forth, but only by the scope of the claim which follows.

I claim:

A tire cover comprising flat side members, each having an annular bead-forming distending ring in an outer edge thereof, and an annular cover member, said cover member being stitched at one edge to the edge of one of said side members, and having an annular bead-forming spring ring in its other edge, said last named edge being adapted to be snapped over a beaded edge on the other side member.

THOMAS J. McCORMICK.